J. BRYER.
CORN-PLANTER.

No. 169,409. Patented Nov. 2, 1875.

WITNESSES:

INVENTOR:
John Bryer
BY
ATTORNEYS.

UNITED STATES PATENT OFFICE.

JOHN BRYER, OF WAGRAM, OHIO.

IMPROVEMENT IN CORN-PLANTERS.

Specification forming part of Letters Patent No. 169,409, dated November 2, 1875; application filed August 6, 1875.

*To all whom it may concern:*

Figure 1:
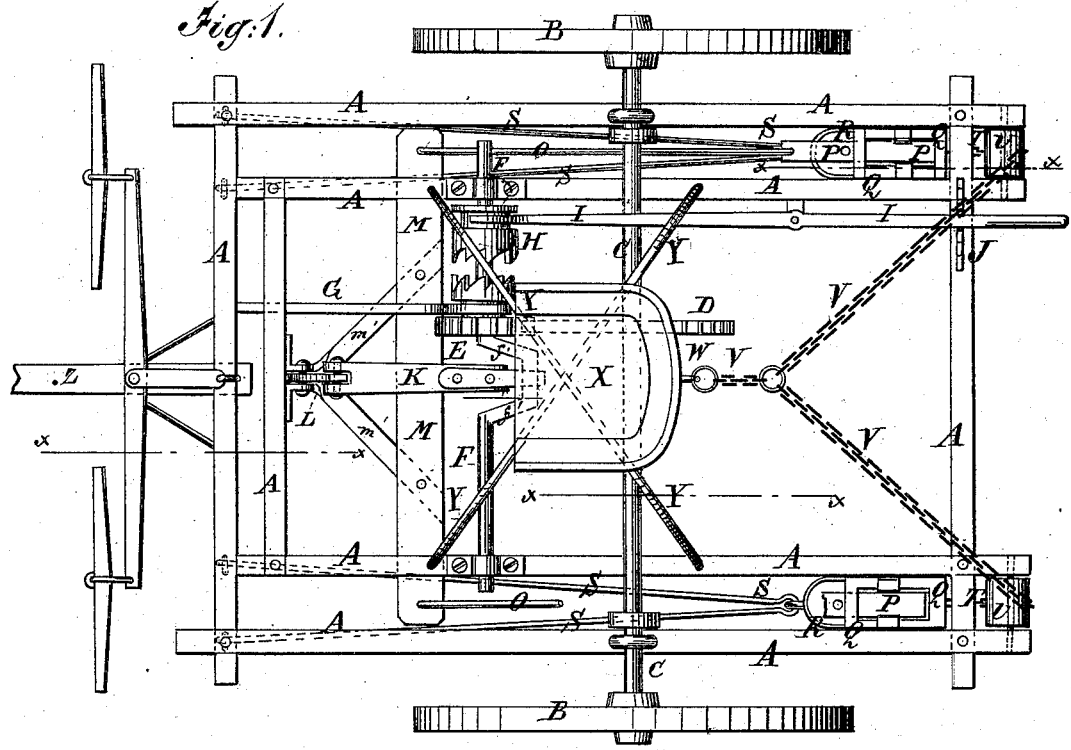
Figure 2:
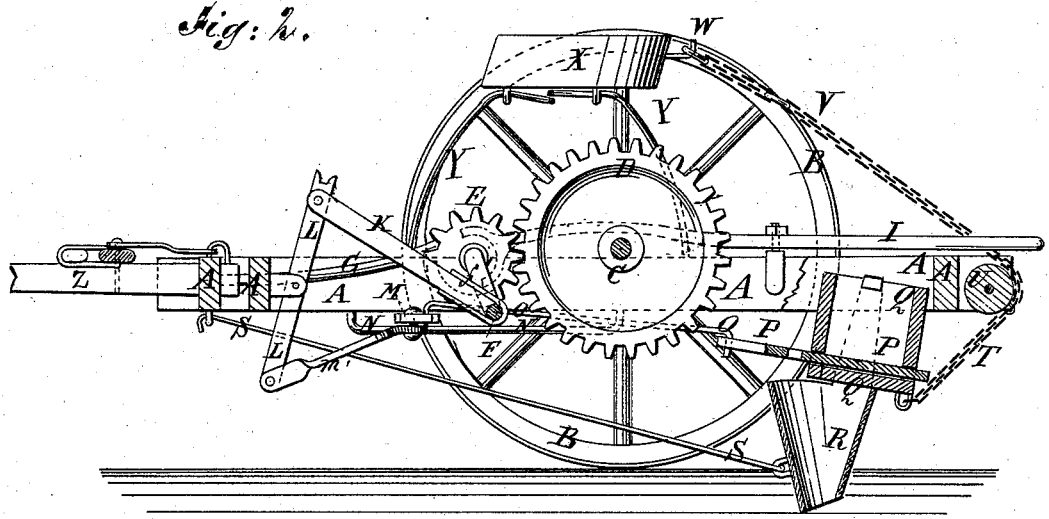

Be it known that I, JOHN BRYER, of Wagram, in the county of Licking and State of Ohio, have invented a new and useful Improvement in Corn-Planter, of which the following is a specification:

Figure 1 is a top view of my improved corn-planter. Fig. 2 is a side view of the same, partly in section through the line $x\ x$, Fig. 1.

Similar letters of reference indicate corresponding parts.

The object of this invention is to furnish an improved corn-planter, simple in construction, reliable in operation, and easily thrown into and out of gear, lowered to, and raised from, the ground, and adjusted to deposit the seed at any desired depth in the ground.

The invention consists in the combination and arrangement of parts hereinafter described and claimed.

A is the frame of the planter, which is made with two parallel side bars upon each side, and two parallel front cross-bars. B are the wheels, one of which is rigidly attached to, and the other runs loosely upon, the axle C. The axle C revolves in bearings attached to the side bars of the frame A. To the axle C is attached a large gear-wheel, D, the teeth of which mesh into the teeth of the smaller gear-wheel E. The gear-wheel E runs loosely upon the shaft F, and is kept from longitudinal movement upon said shaft by a bar, G, attached to the frame A, and which rests in a ring-groove in the hub of the said gear-wheel E, or by other suitable means. Upon the hub of the wheel E are formed teeth, with which engage the teeth of the clutch H, that slides longitudinally upon the shaft F, and is connected with said shaft by a tongue and groove, or other suitable means, so that it may carry the said shaft with it in its revolution. In the clutch H is formed a ring-groove to receive the forked end of the clutch-lever I, which is pivoted to a side bar of the frame A, and the free end of which moves along a toothed catch-bar, J, attached to the frame A, and by which the said lever I is held in any position into which it may be adjusted. Upon the middle part of the shaft F is formed a crank, $f'$, to which is pivoted the end of a pitman, K. The other end of the pitman K is pivoted to the upper end of a short lever, L, which is pivoted to the inner front cross-bar of the frame A, and its lower end is pivoted to the cross-bar M, or to arms or lugs $m'$, attached to said cross-bars. The cross-bar M rests and slides upon keepers N, attached to the lower sides of the inner side bars of the frame A. To the ends of the sliding cross-bar M are pivoted the forward ends of the rods O, the rear ends of which are pivoted to the forward end of the dropping-slides P, so that the said slides may be operated by the advance of the machine. The slides P rest upon the bottoms of the seed-hoppers Q, pass through holes in the front and rear sides of said feed-hoppers, and have holes formed through them of such a size as to hold enough seed for a hill. To the hoppers Q are attached the spouts R, which are made in the shape of inverted cones, and the lower parts of which serve as plows to open the soil to receive the seed, which seed escapes through the apices of said conical spouts, so as to be deposited in the bottom of the channel formed to receive it. The seed is covered by the falling in of the soil as the conical spouts pass in.

The draft-strain upon the spouts R is sustained by the rods S, the rear ends of which are pivoted to the said spouts, and their forward ends are pivoted to the forward part of the frame A. The hoppers Q are placed in the spaces between the outer and inner side bars of the frame A, which thus serve as guides to cause the hoppers to move up and down in vertical planes. To the lower rear parts of the hoppers Q are attached the ends of short cords or chains T, the other ends of which are attached to short rollers U, which are pivoted to and between the rear ends of the outer and inner side bars of the frame A. To the rollers U are also attached the ends of the cords or chains V, the other ends of which are connected together to form a single chain or cord, the links of which, or eyes or rings formed in or attached to it, are hooked upon a hook, W, attached to the back of the driver's seat X, so that the hoppers Q and spouts R may be raised and lowered to deposit the seed at any desired depth in the ground, or raised away from the ground, for convenience in turning and in passing from place to place. The supports Y of the driver's seat X are attached to the frame A. Z is the tongue, to which the draft is applied, and which is attached to the forward end of the frame A.

I am aware of the existence of a corn-planter in which a pair of seed-dropping slides are connected at their front ends with a pair of horizontal pivoted levers, the inner ends of which are connected by a single coupling with a pitman attached to the crank shaft or axle of the planter.

Having thus described my invention, I claim as new and desire to secure by Letters Patent—

The combination of the centrally-pivoted vertical lever L, horizontal reciprocating bar M, and links $m'$ with the pitman K, crank-axle F, clutch and gearing D E H, connecting-rods O, and seed-dropping slides P, as and for the purpose set forth.

JOHN BRYER.

Witnesses:
T. J. HAHN,
JEROME FORD.